April 28, 1925.  
C. P. DUBBS  
EXPANSION JOINT  
Filed April 4, 1921
1,535,209
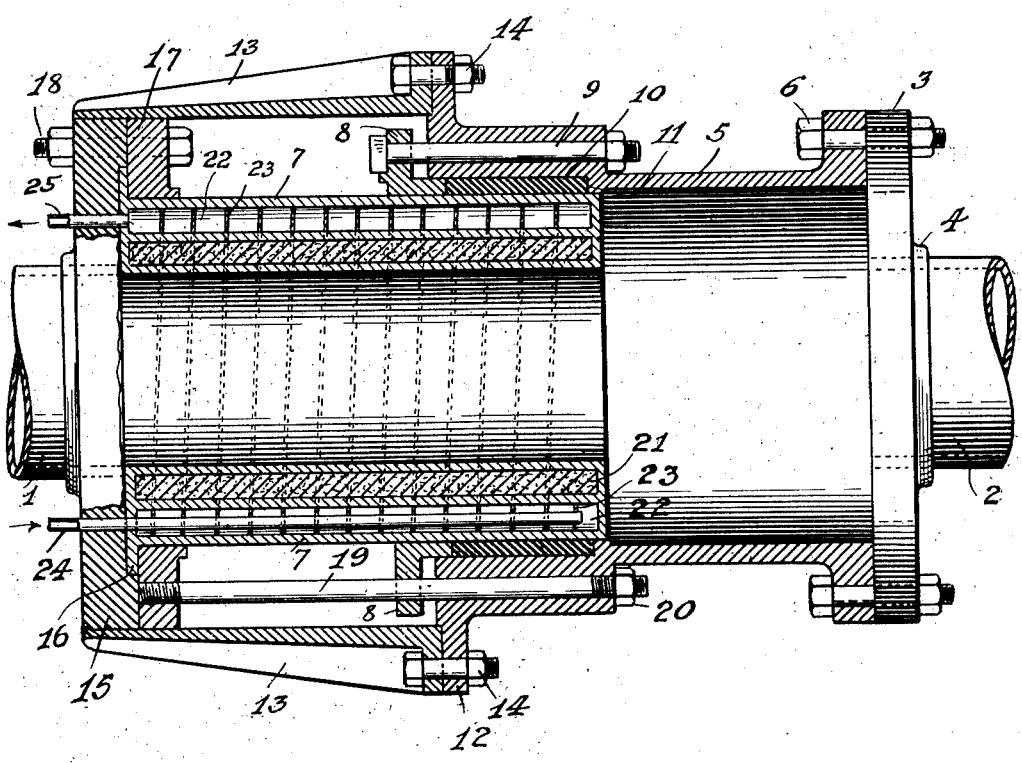
Witness,  
S. S. Mann
Inventor,  
Carbon P. Dubbs,  
By Frank L. Belknap. Atty.

Patented Apr. 28, 1925.

1,535,209

UNITED STATES PATENT OFFICE.

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA.

EXPANSION JOINT.

Application filed April 4, 1921. Serial No. 458,371.

*To all whom it may concern:*

Be it known that I, CARBON P. DUBBS, a citizen of the United States, residing in the city of Wilmette, county of Cook, and State of Illinois, have invented certain new and useful Improvements in Expansion Joints, of which the following is a specification.

This invention relates to improvements in expansion joints and refers more particularly to an expansion joint adaptable for use where the joint is subjected to high temperatures and pressures.

Among the salient objects of the invention are to provide a joint which permits the expansion of the metals in the connecting tubes or pipes and in addition, is so constructed that high temperatures caused by the liquid flowing through the tubes will not affect, in any way, the functioning of the joint; to provide a joint which is cooled by means of a cooling medium circulated about the functioning parts of the joint and particularly the sealing parts so that the high temperatures or pressures will not have such a marked effect on the metal nor will it tend to quickly deteriorate or dry up packing material used for keeping the joint tight.

The single figure is a sectional view of the joint.

Referring in detail to the drawing, 1 and 2 designate the pipes which are to be connected so that the metal in the connecting tubes may be permitted to expand or contract without injuring in any way the apparatus. For this purpose an expansion joint is interposed in the line. This expansion joint comprises a flanged end piece 3 having a boss 4 and swedged in or otherwise united to the tube 2. This flange is connected to an abutting body member 5 by means of bolts and nuts 6. Sliding telescopically in this body member is a slip tube 7 and a gland ring 8 surrounding the slip tube which is held in place by means of gland bolts 9 to confine packing material 10 between the gland 8 and a shoulder formed in the body member as shown at 11. A flanged portion 12 serves to hold the guide members 13 which are bolted thereto by means of the bolts 14. These guide members are positioned at regular intervals about the body member or if desired may consist of a continuous ring, their function being to support the weight of the connection and guide properly the slip tube as it moves forward and backward with the expansion and contraction of the metal. These guides contact the flange 15 which is united to the tube 1. The slip tube 7 has a flanged portion 16 which is fixedly held in place in a Vanstone joint in the flange 15 by means of the retaining ring 17 and bolts and nuts 18. Limiting bolts 19 are positioned about the periphery of the joint screwed in the ring 17 and having the limiting nuts 20 abutting on a shoulder on the body member. When liquid at a high temperature is circulated through the system the joint will expand and contract telescopically sliding on the outer periphery of the slip tube with the expansion and contraction of the metal in the connecting tubes 1 and 2. The packing shown at 10 serves to maintain a pressure tight joint on the sliding surface.

Difficulties have been experienced from time to time with expansion joints due to the fact that when a liquid substance is at very high temperature, it tends to quickly dry out and soon make ineffective the packing positioned at the solid connection in the expansion joint. The present invention is directed to the maintenance of a lower temperature inside of the packing and thereby reducing to a great extent the deterioration that the high temperatures cause to the packing material. For this purpose, the slip tube 7 is divided into two annular compartments extending about the circumference of the tube. Within the inner compartment 21 is placed an insulating material such as sil-o-cel, kieselguhr, asbestos insulating material or other infusible packings having like insulating characteristics. The outer compartment 22 is hollow and has fixed therein a continuous helical baffle member 23. Communicating with an extreme inner point in this compartment is an inlet tube 24 which supplies a cooling circulating medium to this compartment and due to the spiral baffle member, this cooling medium is circulated about the surface of the slip tube and internally thereof and passes out through the outlet line 25. It is obvious that by circulating a cooling medium in this manner and having in addition an insulating substance in the second compartment positioned internally of the circulating compartment, that the temperature to which the packing material 10 is subjected may be materially lowered and its life lengthened.

Particularly in systems where hydrocarbon oils or the like substance which must be raised to extremely high temperatures and circulated through apparatuses at these high temperatures, expansion joints of the described construction eliminate difficulties due to leakage where a common type of expansion joint is practically inoperative or its life is so short that the expense of their upkeep and replacement is prohibitive. It is understood that the construction may be altered in numerous ways without departing from the spirit of the invention.

I claim as my invention:

1. In an expansion joint, the combination with telescopic members, conduits connected to each of said members, a packing interposed between said telescopic members to permit relative movements thereof while maintaining a sealed connection therebetween, one of said members being formed with an elongated annular jacket therein around the exterior of which said packing seats, and means for introducing a cooling liquid to said jacket, said member also having an annular recess located interiorly of the jacket and insulating material disposed within said recess.

2. In an expansion joint, the combination with telescopic members, a pipe connected to each of said members, a packing imposed between said telescopic members to permit relative movement thereof, while maintaining a sealed connection therebetween, one of said members being formed with an interior and an exterior annular recess, said recesses extending throughout substantially the entire length of said telescopic member, said interior annular recess being filled with an insulating material, said exterior annular recess adapted to receive a circulating cooling medium to prevent overheating of the joint.

3. In an expansion joint, the combination with a body member and a sliding tube member, a pipe connected to each of said members, a packing mounted in the wall of said body member, said sliding tube member being formed with two axially spaced annular recesses substantially coextensive therewith, the inner of said annular recesses being filled with an insulating material, means for introducing a cooling medium into the outer annular recess at a point normally adjacent said packing to prevent overheating thereof.

4. In an expansion joint, the combination with a body member and a sliding tube member, a pipe connected to each of said members, packing material mounted in the wall of said body member and held therein by a gland member, said sliding tube member adapted to be telescopically received within said body member with its exterior wall in sliding engagement with said packing material, said sliding tube member being formed with two axially spaced annular recesses substantially co-extensive therewith, the inner of said recesses being filled with an insulating material, means for continuously introducing a cooling liquid into the outer recess, and means for causing said liquid flow in a circuitous path from the end of said sliding tube normally adjacent said packing to the opposite end thereof and means for discharging said cooling liquid.

CARBON P. DUBBS.